United States Patent
Karkhanechi

(10) Patent No.: US 8,199,861 B1
(45) Date of Patent: Jun. 12, 2012

(54) CHANNEL ESTIMATION IN MIMO OFDM COMMUNICATION SYSTEMS

(76) Inventor: Haideh M. Karkhanechi, Saratoga, CA (US)

( * ) Notice: Subject to any disclaimer, the term of this patent is extended or adjusted under 35 U.S.C. 154(b) by 967 days.

(21) Appl. No.: 12/124,967

(22) Filed: May 21, 2008

Related U.S. Application Data

(60) Provisional application No. 60/931,129, filed on May 21, 2007.

(51) Int. Cl.
H04L 27/06 (2006.01)
(52) U.S. Cl. .................................................... 375/340
(58) Field of Classification Search .................. 375/295, 375/299, 267, 260, 259, 316, 340, 324; 370/203, 370/208, 210; 455/101
See application file for complete search history.

(56) References Cited

U.S. PATENT DOCUMENTS

| | | | |
|---|---|---|---|
| 6,757,241 B1 * | 6/2004 | Jones et al. | 370/208 |
| 6,940,914 B1 * | 9/2005 | Lo et al. | 375/260 |
| 2004/0208254 A1 * | 10/2004 | Lee et al. | 375/260 |
| 2005/0237971 A1 * | 10/2005 | Skraparlis | 370/329 |

\* cited by examiner

Primary Examiner — David C. Payne
Assistant Examiner — Vineeta Panwalkar
(74) Attorney, Agent, or Firm — Steven R. Uriarte

(57) ABSTRACT

A channel estimation solution for use in an OFDM MIMO-enabled communication system that includes: receiving a plurality of received signal sets that each respectively include a consecutive set of superimposed time-domain signal blocks; processing the set of received signals by at least converting the consecutive set of superimposed time-domain signal blocks from the time-domain to the frequency-domain by transforming the consecutive set of superimposed time-domain signal blocks to a set of incomplete observed data; and estimating a plurality of a set of channel estimates. The estimation of the plurality of a set of channel estimates includes performing a plurality of iterative processes, where each iterative process includes using a current set of incomplete observed data, calculating a set of decomposed signals, and calculating a set of current channel estimates until the iterative process converges. Detecting the transmitted frequency-domain signal blocks by at least using a set of last channel estimates, tracking the channels, or both, may be further included.

116 Claims, 3 Drawing Sheets

CHANNEL ESTIMATION IN MIMO OFDM COMMUNICATION SYSTEMS

CROSS-REFERENCE TO RELATED APPLICATIONS

This application claims the benefit of U.S. Provisional Application having Ser. No. 60/931,129, filed 21 May 2007, which is incorporated by reference as if fully set forth herein.

BACKGROUND OF THE INVENTION

1. Field of the Invention

The present invention relates to OFDM (Orthogonal Frequency Division Multiplexing), MIMO (Multiple Input, Multiple Output) communication. More particularly, the present invention pertains to an EM channel estimation solution that requires relatively low computational complexity, while remaining relatively effective in providing channel state information estimates for broadband channels in environments that may suffer from slow fading, fast fading, such as due to user mobility, or both.

2. Background Art

The demand for reliable high speed broadband communication systems with high spectral efficiency is growing rapidly. One type of broadband communication solution that provides a relatively spectral efficiency at relatively high transmission rates and that is resistant to the effects of multipath fading includes using OFDM in combination with multi-carrier space time processing and multiple transmit and multiple receive antennas, commonly referred to as MIMO. MIMO OFDM is a suitable modulation scheme for broadband networks due to its ability to cope with multipath fading, and multi-carrier space time processing allows multi-transmit and multi-receive communication through the use of multiple parallel sub-channels at high data rates that can provide diversity gain and spatial multiplexing gain.

OFDM is commonly known solution that is resistant to multipath fading and has been implemented in a variety of wireless standards, including IEEE 802.16 for Wireless Local and Metropolitan Networks, IEEE 802.11 for high speed Wireless Local Area Networks (WLAN), and Digital Video Broadcasting (DVB). The IEEE 802.16-2004 standard is primarily intended for fixed wireless systems, and the 802.16e amendment is intended for both fixed and mobile wireless systems. The IEEE 802.11 Working Group has adopted the amendment, 802.11n, which adds multiple transmit and receive antennas for increased throughput and spatial diversity.

However, in broadband networks or communication systems that employ MIMO OFDM, channel fading remains a challenging problem when estimating MIMO channels. Currently known channel estimation techniques are relatively complex and use training sequences in a relatively inefficient manner. For example, one class of channel estimation technique includes using a preamble structure where the first OFDM block sent is composed of a training block. The training block can be composed of a number of pilot symbols on selected subcarriers while the rest can be set to zero. The frequency response of the remaining subcarriers can then be interpolated by first obtaining an initial channel estimate, finding a time-domain channel estimate, windowing significant taps, and converting back to the frequency-domain and replacing the values of the known subcarriers by the initial estimate. This pilot-assisted class of channel estimation method is further disclosed by M. Belotserkovsky, in the prior art reference entitled, "An equalizer initialization algorithm for OFDM receivers", Digest of Technical Papers, International Conference on Consumer Electronics, 2002; and by Jiun Siew, Robert Piechocki, Andrew Nix, and Simon Armour, in another prior art reference entitled, "A channel estimation method for MIMO-OFDM Systems", Proceedings of the London Communications Symposium, pp. 372-373, 2002.

Another class of channel estimation techniques may be performed by periodically transmitting training blocks or sequences, such as at the start of each frame. This class of channel estimation techniques sometimes use an EM (Expectation and Maximization)-based approach, and which include techniques further disclosed by Meir Feder and Ehud Weinstein in their prior art reference entitled, "Parameter Estimation of Superimposed Signals Using the EM Algorithm," IEEE Transactions on Acoustics, Speech, and Signal Processing, vol. 36, No. 4, April 1988; by Laurent Mazet, Veronique Buzenac-Settineri, Marc de Courville, and Pierre Duhamel in their prior art reference entitled, "EM-based Semi-Blind Estimation of Time-Varying Channels," IEEE Workshop on Signal Processing Advances in Wireless Communications, 2003; by X. Zhuang and F. Vook in their prior art reference entitled, "Iterative Channel estimation and decoding for a turbo-coded OFDM system via the EM algorithm," IEEE International Conference on Acoustics, Speech, and Signal Processing, Orlando, USA, May 2002; by Waleed M. Younis and Ali H. Sayed in their prior art reference entitled, "Efficient Adaptive Receivers for Joint Equalization and Interference Cancellation in Multiuser Space-Time Block-Coded Systems," IEEE Transactions on Signal Processing, vol. 51, No. 11, November 2003; by H. Zamiri-Jafarian and S. Pasupathy in their prior art reference entitled, "Recursive Channel Estimation for Wireless Communication via the EM Algorithm," IEEE International Conference on Personal Wireless Communications, 1997; by Y. Zhao in his prior art reference entitled, "An EM Algorithm for Linear Distortion Channel Estimation Based on Observations from Mixture of Gaussian Sources," IEEE Trans. on Speech and Audio Processing, Vol. 7, July 1999; and by C. Cozzo and B. Hughes in their prior art reference entitled, "Joint Channel Estimation and Data Symbol Detection in Space-Time Communications," ICC, Commun. Theory Mini-Symposium, June 2000, and Carlos H. Aldana, and John Cioffi, "Channel Tracking for Multiple Input, Single Output Systems using EM algorithm," IEEE ICC, vol. 1, 2004. These known EM-based channel estimation techniques, however, are computationally complex, and thus are relatively expensive to design and manufacture.

Consequently, a need exists for a channel estimation solution that is relatively less complex than current solutions, while remaining relatively effective in calculating CSI estimates for channels in environments that may suffer from slow channel fading, fast channel fading, or both.

SUMMARY

Channel estimation solutions are provided that are relatively effective in calculating CSI estimates for channels in environments that may suffer from slow channel fading, fast channel fading, or both. A channel estimation solution may include: receiving, via a plurality of antennas from a plurality of MIMO OFDM-enabled communication devices via a plurality of channels, a plurality of received signal sets that each respectively include a consecutive set of superimposed time-domain signal blocks; processing the set of received signals by at least converting the consecutive set of superimposed time-domain signal blocks from the time-domain to the frequency-domain by transforming the consecutive set of superimposed time-domain signal blocks to a set of incomplete observed data; and estimating a plurality of a set of channel estimates.

The estimation of the plurality of a set of channel estimates includes performing a plurality of iterative processes, where each iterative process includes using a current set of incomplete observed data, calculating a set of decomposed signals, and calculating a set of current channel estimates until the iterative process converges.

These channel estimation solutions may be modified to include detecting the sets of transmitted frequency-domain signal blocks by at least using a set of last channel estimates. In addition, these channel estimation solutions may be further modified to include tracking the plurality of channels, where tracking includes repeating the performing of the plurality of iterative processes, and using the set of last channel estimates as a set of initial channel estimates when performing a first iteration under the iterative process, and where the performing an iterative process is repeated until a threshold number is met.

DETAILED DESCRIPTION OF THE INVENTION

In the following detailed description, for purposes of explanation, numerous specific details are set forth to provide a thorough understanding of the various embodiments of the present invention. Those of ordinary skill in the art will realize that these various embodiments of the present invention are illustrative only and are not intended to be limiting in any way. Other embodiments of the present invention will readily suggest themselves to such skilled persons having benefit of the herein disclosure. In addition, after perusal of this application, those skilled in the art would recognize that any processes, data structures and functions described herein may be implemented by using a general purpose computer; program code; other devices known in the computer, networking and program fields, including DSPs, ASICs, FPGAs, reconfigurable logic devices, and the like; or any combination of these.

For clarity purposes, not all of the routine features of the embodiments described herein are shown or described. It is appreciated that in the development of any such actual implementation, numerous implementation-specific decisions must be made to achieve the developer's specific goals. These specific goals will vary from one implementation to another and from one developer to another. Moreover, it will be appreciated that such a development effort might be complex and time-consuming but would nevertheless be a routine engineering undertaking for those of ordinary skill in the art having the benefit of the herein disclosure.

The various embodiments of the present invention pertain to a channel estimation solution that estimates, by using a novel expectation and maximization method, the channel state parameters or information, named "CSI" of at least one channel in a MIMO OFDM communication system or network. These CSI parameters may then used by a device, such as a computing station, in the communication system to decode and detect signals received by the computing station from multiple communication devices.

This channel estimation solution may also include a tracking function that adapts to CSI changes of channels associated with communication devices which are supported by the communication system or network. This tracking function enhances the ability to estimate and track the characteristics, such as the impulse responses of time-varying channels, including channels that exhibit slow fading, fast fading, or both. This channel estimation solution may be used in a variety of communication systems or networks that employ MIMO channels with space time processing and OFDM for encoding and decoding. In addition, this channel estimation solution supports multiple users or communication devices.

Figure 1:
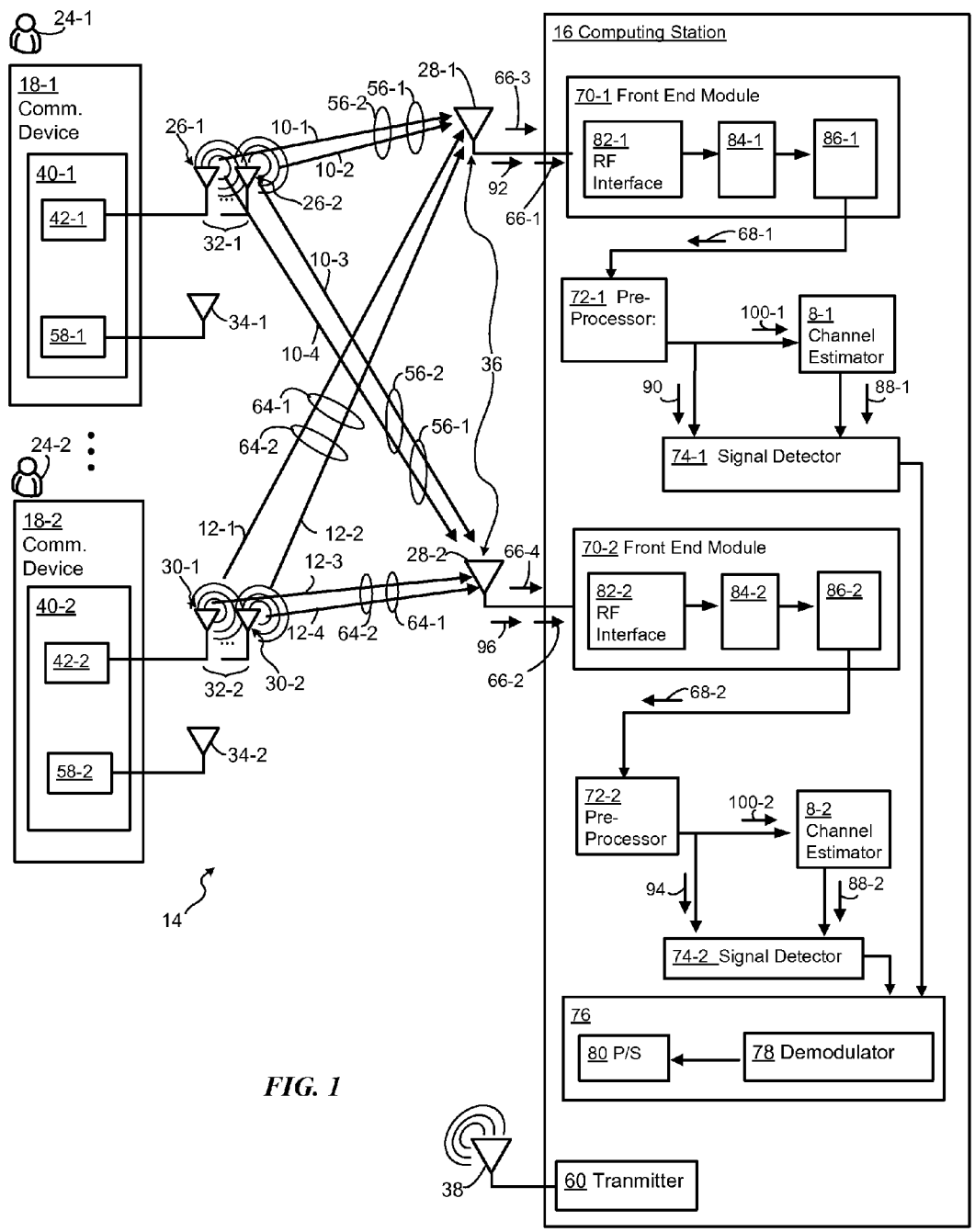
FIG. 1 is a block diagram of a communication system that uses an channel estimation apparatus in accordance with one embodiment of the present invention.

Referring now to FIG. 1 and in accordance with one embodiment of the present invention, a set of channel estimators 8-1 and 8-2 estimate CSI changes related to a set of channels, such as channels 10-1 through 10-4 and channels 12-1 through 12-4, used by a wireless MIMO OFDM-enabled communication system 14. Communication system 14 further includes a computing station 16; a set of communication devices 18-1 and 18-2; and a set of signal detectors 74-1 and 74-2 respectively disposed to receive a set of last channel estimates 22-1 and 22-2 from channel estimators 8-1 and 8-2. Communication system 14 may be referred to as a multiple user communication system because it can support multiple communication devices, which in turn, can be used to support multiple users, such as users 24-1 and 24-2.

The term "broadband channel" is a transmission medium that can support the simultaneous transmission of multiple frequency tones (m). The transmission medium may be in the form of air or any medium that can function as a signal conduit. In FIG. 1, using a channel for wireless signal transmission and reception includes using a pair of antennas, named "transmit-receive link", through which a broadband signal may be transmitted and received, respectively. For example, channels 10-1 through 10-4 may include transmit-receive links that respectively comprise transmit antenna 26-1 and receive antenna 28-1, transmit antenna 26-2 and receive antenna 28-1, transmit antenna 26-1 and receive antenna 28-2, and transmit antenna 26-2 and receive antenna 28-2, while channels 12-1 through 12-4 may include transmit-receive links that respectively comprise transmit antenna 30-1 and receive antenna 28-1, transmit antenna 30-2 and receive antenna 28-1, transmit antenna 30-2 and receive antenna 28-2, and transmit antenna 30-2 and receive antenna 28-2. The term "broadband channel" is intended to mean a channel that can be used to transmit a broadband signal, and a broadband signal is any modulated signal that spans over a relatively wide range of frequencies. The term "MIMO channel" is used interchangeably with the term "channel" and is intended to include a set of channels used in or by a MIMO OFDM-enabled communication system, such as communication system 14. The term broadband channel is not intended to be limiting in any way and includes any channel that can support the wireless transmission of signals, including channels that may be referred to as wideband or ultrawide band channels.

Computing station 16 communicates with at least two communication devices, such as communication devices 18-1 and 18-2, through a set of broadband channels, such as channels 10-1 through 10-4, and channels 12-1 through 12-4, respectively. Computing station 16 and communication devices 18-1 and 18-2 are MIMO OFDM-enabled devices and thus, are devices that employ features associated with MIMO and OFDM technology. Computing station 16 may be implemented using any computing device that can be modified to include the present invention or perform the functions related to the present invention within the scope and spirit of the herein disclosure, such as a computing device that can provide cellular base station, wireless access point functionality, routing, authentication, accounting, or any combination these to communication devices 18-1 and 18-2 in communication system 14. For example, this computing device may be a channel card for use with a cellular base station, or a reception module used in a wireless receiver that supports MIMO OFDM.

The term "MIMO is generally intended to refer to devices that use multiple transmit and multiple receive antennas and employ space time coding, such as STBC or OSTBC.

The term "OFDM" is intended to include any frequency-division multiplexing and modulation scheme, such as OFDM, COFDM, OFDMA, SOFDMA, and the like. OFDM is a multi carrier digital modulation scheme with multiple and closely spaced subcarriers. Under an OFDM modulation scheme input data, which is in digital form, is modulated across these subcarriers using a conventional modulation scheme, such as QAM or PSK. Each subcarrier relates to a frequency tone, and the spacing among these subcarriers is such that all subcarriers are orthogonal. OFDM and its related variants listed above are commonly known by those of ordinary skill in the art. For example, OFDM is employed in the IEEE 802.11 Wireless LAN standard, while both OFDM and OFDMA are employed in the IEEE 802.16 Wireless MAN standard, which is sometimes referred to as "WiMAX".

The term "STBC" is intended to include any form of space time block codes, however the type of space time encoding is not intended to be limiting in any way. STBC is usually represented by a two dimensional matrix, named "coding matrix", where one dimension represents a time slot or unit, named "time dimension", and the other dimension represents a number of transmit antennas, named "transmit dimension", employed by a MIMO OFDM-enabled device, such as communication device 18-1 or 18-2. In one embodiment of the present invention, the matrix elements that correspond to a transmit dimension represent a set of frequency-domain signal blocks. The term "matrix element" may be used interchangeably with the term "matrix vector", herein.

STBC is commonly known by those in the art, and may use an STBC coding matrix to represent the space-time relationship of the frequency-domain signal blocks and the transmit antennas used. In the example shown in FIG. 1 and although not intended to be limiting in any way, the form of STBC used is orthogonal, which may be referred to herein as "OSTBC", which is commonly known. In addition, the STBC coding matrix size used is two columns by two rows, named "2×2", since in the embodiment shown, only two transmit antennas are used by each communication device. A STBC coding matrix size of 2×2 is sometimes commonly referred to as an Alamouti STBC.

The variant multipath channel impulse response for each channel, which are used by communication devices, such as 18-1 and 18-2, that are supported by communication system 14, can be defined as:

$$h(t) = \sum_{i=1}^{K} \alpha_i e^{j(2\pi f_{d_i}(t) + \theta_i)} \delta(t - \tau_i) \quad (1)$$

where, K is the total number of propagation paths; $\alpha_i$ is complex channel coefficient of the $i^{th}$ path (Rayleigh distributed); $f_{d_i}$ is the Doppler frequency of the $i^{th}$ path $\theta_i$ is the initial angle of the $i^{th}$ path, (here is assumed to be zero); $\tau_i$ is the delay time of the $i^{th}$ path. Equation (1) assumes that each channel with the impulse response defined using equation (1) remains time-invariant for every two consecutive time-domain signal block sets that will be sent to each respective channel in the form of broadband transmitted signals, such as transmitted signal block sets 56-1 and 56-2, discussed further below.

Computing station 16 is configured to use at least M receive antennas, such as 28-1 and 28-2, for M communication devices used in communication system 14 with each communication device using at least two transmit antennas. In FIG. 1, two communication devices 18-1 and 18-2 are supported by communication system 14, and thus, computing station 16 includes an antenna array 36 that has at least two receive antennas, such as receive antennas 28-1 and 28-2. In effect, the number of receive antennas used by computing station 16 determines the maximum number of communication devices that can be supported by communication system 14. For example, up to a maximum of five communication devices can be supported if receive antenna array 36 is disposed to include three additional receive antennas (not shown) that are in addition to receive antennas 28-1 and 28-2, resulting in a total of five receive antennas. Similarly, if receive antenna array 36 is disposed to have ten receive antennas (not shown), computing station 16 can support up to a maximum of ten communication devices. For clarity purposes only communication devices 18-1 and 18-2 are shown.

Communication device 18-1 may be in the form of a computing device, such as a portable or laptop computer, cellular telephone, or the like, that includes a user interface (not shown) which permits a user 24-1 to communicate with at least one other user through another similar communication device, such as communication device 18-2 and user 24-2, respectively, through computing station 16. Each communication device may also include an antenna array for sending transmitted signals. In FIG. 1, for example, communication devices 18-1 and 18-2 respectively include antenna arrays 32-1 and 32-2. Antenna arrays 32-1 and 32-2 each have at least two transmit antennas, such as transmit antennas 26-1 and 26-2, and transmit antennas 30-1 and 30-2.

Each communication device supported by communication system 14 may be further configured to include at least one receive antenna for receiving signals sent by computing station 16, such as receive antennas 34-1 and 34-2. The type of encoding and modulation of these signals sent by computing station is not intended to be limiting in any way but may be in a form which permits a receiving communication device to receive and process the signals received through its respective antenna. A receive antenna is any antenna that can be used to receive signals transmitted by devices within communication system 14, such as communication devices 18-1 and 18-2.

Computing station 16 may also include at least one transmit antenna 38 that can be used to transmit signals to a communication device in communication system 14, such as communication device 18-1 or 18-2. Although computing station 16 and communication devices 18-1 and 18-2 are shown with antennas dedicated for receiving, such as receive antennas 28-1, 28-2, 34-1 and 34-2, and with antennas dedicated for transmitting, such as transmit antennas 26-1, 26-2, 30-1 and 30-2, the use of dedicated receive and transmit antennas is not intended to be limiting in any way.

The number of transmit antennas used by a supported communication device equals the size of the coding matrix employed. For example, if an Alamouti STBC coding matrix is used, then two transmit antennas are required since an Alamouti STBC coding matrix uses a STBC coding matrix transmit dimension size of two. Similarly, if a higher order STBC coding matrix that has a transmit dimension size of four is used, then four transmit antennas (not shown) are required for each supported communication device. In the embodiment shown in FIG. 1, a STBC coding matrix size of 2×2 is used, requiring two transmit antennas for each communication device supported by computing station 16, such as transmit antennas 26-1 and 26-2, and communication device 18-1 and transmit antennas 30-1 and 30-2 communication device 18-2, respectively. Thus, the number of transmit antennas used per communication device is at least equal to the column size of the space time coding matrix size selected for encoding OFDM frequency tones. In addition, the use of STBC and the maximum size of the STBC matrix used by communication system 14 and its supported communication devices, such as communication devices 18-1 and 18-2, are not intended to be limiting. Other forms of space time coding may be used, such as OSTBC, and other STBC matrix sizes may be used. Not all STBC coding matrices are square or have equal dimension sizes.

Figure 2:
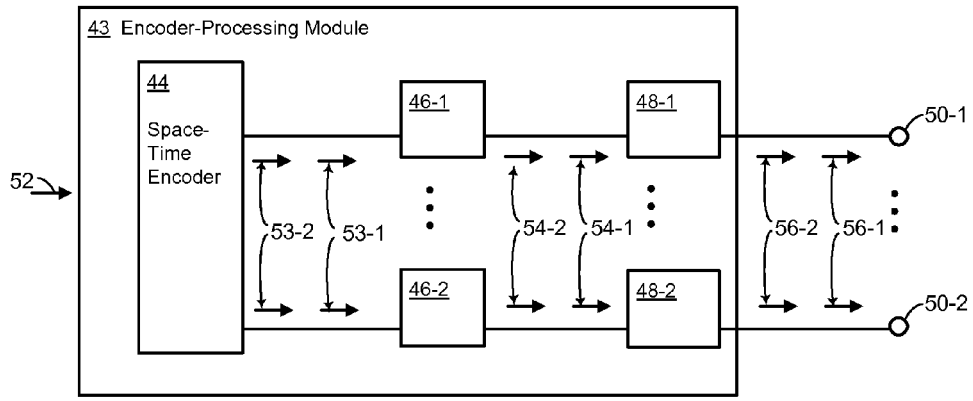
FIG. 2 is a block diagram of a encoder-processing module for use with a MIMO OFDM-enabled communication device in accordance with another embodiment of the present invention.

Communication devices 18-1 and 18-2 may be also configured to include a set of wireless network interfaces 40-1 and 40-2 that include encoder-processing modules 42-1 and 42-2, respectively. For example, encoder-processing module 42-1 or 42-2 may be implemented to have substantially the same form and function as an encoder-processing module 43, which is illustrated in FIG. 2. Encoder-processing module 43 includes a space-time encoder 44, time-domain transform devices 46-1 and 46-2, broadband modulators/guard band adders 48-1 and 48-2, and a set of outputs 50-1 and 50-2 for coupling to an antenna array that includes a set of transmit antennas, such as transmit antennas 26-1 and 26-2 or transmit antennas 30-1 and 30-2 disclosed in FIG. 1.

Space-time encoder 44 receives an input signal 52, such as data from communication device 18-1, user 24-1 or both, and processes input signal 52 by using OFDM modulation. After OFDM modulation, space-time encoder 44 performs further processing by space time encoding the OFDM modulated form (not shown) of input signal 52. This modulated form of input signal 52 is commonly referred to as a set of OFDM frequency tones, OFDM symbols, or OFDM blocks. When configured to use a coding matrix, such as the Alamouti STBC coding matrix, space time encoder 44 outputs a set of frequency-domain signals, such as S1, S2, −S2* and S1* that represent the elements of the coding matrix.

As shown in FIG. 2, S1 and S2 may be referred to collectively as a set of transmit frequency-domain signal blocks 53-1, while −S2* and S1* may be referred to collectively as a set of transmit frequency-domain signal blocks 53-2. Space-time encoder 44 outputs sets of transmit frequency-domain signal blocks 53-1 and 53-2, which are received and transformed by time-domain transform devices 46-1 and 46-2 into a consecutive set of transmit time-domain signal block sets that include transmit time-domain signal block set 54-1 and transmit time-domain signal block set 54-2, respectively. Consecutive sets of transmit time-domain signal block sets 54-1 and 54-2 are then further processed so that they are suitable for transmission during two consecutive time slots, such as k and k+1 through two transmit antennas of the communication device that has been disposed to use encoder-processing module 43.

At time unit k, the coding matrix used by space time encoder 44 in the embodiment in FIG. 2 may be expressed generally as:

$$\begin{bmatrix} S_{k,1}(m) & S_{k,2}(m) \\ -S^*_{k,2}(m) & S^*_{k,1}(m) \end{bmatrix} \quad (2)$$

where, $$S_{k+1,1}(m) = -S^*_{k,2}(m)$$

$$S_{k+1,2}(m) = -S^*_{k,1}(m) \quad (3)$$

and where m represents a frequency tone.

The coding matrix of equation (2) can be written as:

$$\begin{bmatrix} \overline{S}_{k,1} & \overline{S}_{k,2} \\ -\overline{S}^*_{k,2} & \overline{S}^*_{k,1} \end{bmatrix} \quad (4)$$

where, $\overline{S}_{k,1}$ and $-\overline{S}^*_{k,2}$ may be the matrix vectors representing set of frequency-domain signal blocks 53-1 and where $\overline{S}_{k,2}$ and $\overline{S}^*_{k,1}$ may be the matrix vectors representing set of frequency-domain signal blocks 53-2.

Time-domain transform devices 46-1 and 46-2 receives and transforms frequency-domain signal blocks 53-1 and 53-2 into consecutive sets of transmit time-domain signal block sets 54-1 and 54-2, respectively. Time-domain signal blocks 54-1 and 54-2 may be generally expressed as $D^*x_{k,1}^{(i)}$, $D^*x_{k,2}^{(i)}$, and $-D^*x^*_{k,2}^{(i)}$ and $D^*x^*_{k,1}^{(i)}$, respectively, which are listed in Table 1, below.

TABLE 1

| Transmit Antenna | Time Units | |
|---|---|---|
| | k | k + 1 |
| 1 | $D^*x_{k,1}^{(i)}$ | $-D^*x^*_{k,2}^{(i)}$ |
| 2 | $D^*x_{k,2}^{(i)}$ | $D^*x^*_{k,1}^{(i)}$ |

Table 1 illustrates that, for every two time units k and k+1, where k=0, 2, 4, . . . , N-symbol frequency-domain signal blocks $x_{k,1}^{(i)}$ and $x_{k,2}^{(i)}$ are transmitted by using the Alamouti STBC coding matrix, where $x_{k,1}^{(i)}$ and $x_{k,2}^{(i)}$ frequency-domain signal blocks may be collectively referred to as a set of transmit frequency-domain signal blocks, such as 53-1; $-x^*_{k,2}^{(i)}$ and $x^*_{k,1}^{(i)}$ frequency-domain signal blocks may be collectively referred to as another set of transmit frequency-domain signal blocks, such as 53-2; D* is the N×N Fourier transform, such as IDFT, matrix; and i is a particular communication device, such as 18-1 or 18-2.

Table 1 also illustrates that a set of frequency-domain signal blocks are transformed to a set of transmit time-domain signal blocks before transmission through a transmit antenna set or array as determined by the STBC coding matrix used for a particular time unit k. Thus, for every two consecutive sets of transmit frequency-domain signal block sets calculated and outputted by space time encoder 44, time-domain transform devices 46-1 and 46-2 calculates two consecutive sets of transmit time-domain signal block sets.

In addition, to minimize or eliminate inter-symbol interference, also referred to herein as "inter-block interference" or "IBI", guard band adders 48-1 and 48-2 may be used to add a cyclic prefix or equivalent guard band interval to each set of transmit time-domain signal blocks, such as set of transmit time-domain signal blocks 54-1 and 54-2 before transmission. These transmit time-domain signal blocks and guard band intervals may then be modulated into a consecutive set of transmitted signal block sets, such as transmitted signal block sets 56-1 and 56-2, which may be in a broadband signal form and which are eventually transmitted through suitable transmit antennas, such as transmit antennas 26-1 and 26-2 in FIG. 1. Since two consecutive sets of transmitted signal block sets 56-1 and 56-2 are transmitted for every two consecutive sets of transmit time-domain signal block sets, such as 54-1 and 54-2, it can also be said that these consecutive sets of transmitted signal blocks sets 56-1 and 56-2 are transmitted in response to the transmission of two transmit frequency-domain signal blocks 53-1 and 53-2 by space-time encoder 44 through its respective outputs (not shown). During transmission by a communication device, such as 18-1 or 18-2, the communication device keeps its respective channels fixed during two consecutive time units, such as k and k+1, and sends a first transmitted signal block set, such as 56-1, during interval k, and sends a second transmitted signal block set, such as 56-2, during interval k+1.

Implementing an encoder-processing module according to the example shown in FIG. 2 is not intended to be limiting. Any design or implementation scheme may be employed since encoder-processing modules that perform OFDM modulation and space time encoding are commonly available. Moreover, more than two transmit antennas may be used by a supported communication device. Referring also to FIG. 1, for instance, if communication device 18-1 is disposed to four transmit antennas (not shown) instead of transmit antennas 26-1 and 26-2, as shown, encoder-processing 43 would require a space time encoder that outputs a set of four transmit frequency-domain signal blocks per encoding interval, enabling encoder-processing module 43 to transmit four transmit time-domain signal blocks, which may be in the form of transmitted signal blocks, across these four transmit antennas per transmit interval.

The term "time-domain transform device" is intended to include any signal processing device that can transform an incoming signal, such a frequency-domain signal block, into a time-domain signal block. Such devices are commonly known and may include the use of a DSP, ASIC, FPGA or any combination of these. Further, time-domain transform device 46-1, 46-2 or both, may employ inverse Fast Fourier Transforms (IFFT) but this technique is not intended to limit the present invention in any way. For example, a Fast Fourier Transform technique may instead be used.

Referring again to FIG. 1, each wireless network interface 40-1 or 40-2 may also include a receiver, such as receiver 58-1 or 58-2, that can receive a signal from a receive antenna, such as receive antenna 34-1 or 34-2, respectively. Receivers 58-1 and 58-2 can process data that is transmitted by computing station 16 through a transmitter coupled to transmit antenna 38, and that is received through receive antennas 34-1 and 34-2, respectively. Transmitter 60 can use any known method to modulate and transmit signals through antenna 38, while receivers 58-1 and 58-2 may process data received from computing station by using any known and compatible method for receiving and demodulating the signal received at receive antenna 34-1 and 34-2, respectively. In addition, using separate antennas for transmitting and receiving transmitted data signals is not intended to be limiting in any way. One of ordinary skill in the art would readily recognize that wireless network interfaces 40-1 and 40-2 may be disposed to support using at least one antenna that can be used to both receive and transmit data.

Computing station 16 may further include a set of front end modules 70-1 and 70-2, a set of pre-processors 72-1 and 72-2, a set of signal detectors 74-1 and 74-2, and a set of circuits 76 that may be used by computing station 16 to further process a received signal so that the input data transmitted by a communication device, such as input data signal 52 in FIG. 2 and communication device 18-1, can be received by additional modules (not shown) that may be included with computing station 16. Further processing by set of circuits 76 may include a demodulator 78 and parallel to serial converter 80 for respectively demodulating and processing signals received from signal detectors 74-1 and 74-2. Further processing by set of circuits 76 as described is not intended to limit the present invention in any way. Other further processing may be performed by computing station 16, such as but not limited to optimizing the bit error rate, named "BER", which may be accomplished by averaging or selecting the best signal.

During operation, each front end module is disposed to receive at least one superimposed signal, named "received signal" from their respective receive antennas, such as 28-1 and 28-2. Each received signal may include a superposition of transmitted signal blocks previously sent by M communication devices, such as 18-1 and 18-2, plus Gaussian white noise, named "AWGN", for a given time unit. For two consecutive time units and in accordance with one embodiment of the present invention, these transmitted signal blocks are related to the transmit frequency-domain signal blocks, such as set of transmit frequency-domain signal blocks 53-1 and 53-2, that were previously processed by space time encoder 44 from a given data signal, such as input data signal 52; and to the consecutive set of transmit time-domain signal block sets, such as transmit time-domain signal block sets 54-1 and 54-2, that were transformed from sets of transmit frequency-domain signal blocks 53-1 and 53-2 by time-domain transform devices 46-1 and 46-2, respectively.

In one example, during two consecutive time units, communication device 18-1 may transmit a consecutive set of transmitted signal block sets 56-1 and 56-2 via its respective transmit antennas 26-1 and 26-2, while communication device 18-2 may also transmit a consecutive set of transmitted signal block sets 64-1 and 64-2. These transmitted signal block sets are received by computing station 16 through receive antennas 28-1 and 28-2 in the form of received signals 66-1 and 66-3 and received signals 66-2 and 66-4, respectively. Under this example, received signal 66-1 and 66-3 at receive antenna 28-1 and received signals 66-2 and 66-4 at receive antenna 28-2 may be used to represent a set of superimposed signals that include transmitted signal blocks sets 56-1 and 64-1, and transmitted signal block sets 56-2 and 64-2, respectively, which were sent by communication devices 18-1 and 18-2 during two consecutive time units.

These received signals are then processed by front end modules 70-1 and 70-2 by converting these received signals into respective superimposed time-domain signal blocks using any known means. For instance, using the example configuration for front end modules 70-1 and 70-2, receive signals 66-1 and 66-3, and receive signals 66-2 and 66-4, may be received in broadband form by RF interfaces 82-1 and 82-2, down-converted, filtered (analog filter), and converted from analog to digital by A-D/Filtering devices 84-1 and 84-2, and processed for cyclic prefix removal by guard removing device 86-1 and 86-2, respectively. The respective functions described above for RF interfaces 82-1 and 82-2, A-D/Filtering devices 84-1 and 84-2, and guard removing device 86-1 and 86-2 are commonly known or available from commonly available devices, and thus are not further disclosed to avoid unduly adding complexity to the herein disclosure.

The processing of received signals 66-1 and 66-3 by front end module 70-1 during two consecutive time units results in front end module 70-1 calculating a consecutive set of superimposed time-domain signal blocks, such as a consecutive set of superimposed time-domain signal blocks 68-1. Similarly, the processing of received signals 66-2 and 66-4 by front end module 70-2 during two consecutive time units results in front end module 70-2 calculating a consecutive set of superimposed time-domain signal blocks 68-2. A consecutive set of superimposed time-domain signal blocks, such as 68-1 or 68-2, for the time interval k and k+1 at a receive antenna 1, such as receive antenna 28-1 or 28-2, may be expressed as:

$$r_{k,l} = \sum_{i=1}^{M} (h_{1,l}^{(i)} D * x_{k,1}^{(i)} + h_{2,l}^{(i)} D * x_{k,2}^{(i)}) + n_{k,l} \quad (5)$$

$$r_{k+1,l} = \sum_{i=1}^{M} (-h_{1,l}^{(i)} D * x_{k,2}^{*(i)} + h_{2,l}^{(i)} D * x_{k,1}^{*(i)}) + n_{k+1,l}$$

where $(.)^*$ denotes complex conjugation, and where $h_{1,l}^{(i)}$ and $h_{2,l}^{(i)}$ are the circulant channel matrices from the first and second transmit antennas of the $i^{th}$ communication device, respectively, to the $l^{th}$ receive antenna, of the form:

$$h^{(i)} = \begin{bmatrix} h^{(i)}(0) & 0 & \ldots & h^{(i)}(v) & \ldots & h^{(i)}(1) \\ \vdots & \ddots & \ddots & \ddots & \ddots & \vdots \\ h^{(i)}(v-1) & \ldots & h^{(i)}(0) & 0 & \ldots & h^{(i)}(v) \\ h^{(i)}(v) & h^{(i)}(v-1) & \ldots & h^{(i)}(0) & 0 & \ldots \\ \vdots & \ddots & \ddots & \ddots & \ddots & \vdots \\ 0 & \ldots & h^{(i)}(v) & h^{(i)}(v-1) & \ldots & h^{(i)}(0) \end{bmatrix}. \quad (6)$$

where v is the length of a cyclic prefix previously added by a communication device that transmitted the transmitted signal blocks related to the consecutive sets of time-domain signal block sets 68-1 or 68-2.

Preprocessors 72-1 and 72-2 are respectively disposed to receive consecutive set of superimposed time-domain signal blocks 68-1 and 68-2. Preprocessors 72-1 and 72-2 are further respectively disposed to convert consecutive set of superimposed time-domain signal blocks, such as 68-1 and 68-2, into consecutive set of superimposed frequency-domain signal blocks, such as 100-1 and 100-2, respectively. Conversion of consecutive set of superimposed time-domain signal blocks 68-1 and 68-2 may be performed by applying the DFT matrix D in Table 1 to both sides of equation (5), obtaining the following transformed observations:

$$R_{k,l} = \sum_{i=1}^{M} (\Omega_{1,l}^{(i)} x_{k,1}^{(i)} + \Omega_{2,l}^{(i)} x_{k,2}^{(i)}) + N_{k,l} \quad (7)$$

$$R_{k+1,l} = \sum_{i=1}^{M} (-\Omega_{1,l}^{(i)} x_{k,2}^{*(i)} + \Omega_{2,l}^{(i)} x_{k,1}^{*(i)}) + N_{k+1,l}$$

where, M is equal to the number of receive antennas used by computing station 16 or the number of computing devices, R=Dr, N=Dn and represents AWGN, and $\Omega_{1,l}^{(i)}$ and $\Omega_{2,l}^{(i)}$ are given by $\Omega_{1,l}^{(i)} = Dh_{1,l}^{(i)} D^*$ and $\Omega_{2,l}^{(i)} = Dh_{2,l}^{(i)} D^*$ (diagonalized matrices), respectively. Although DFT is used to obtain the transformed observations in (7), one of ordinary skill in the art would readily recognize after receiving the herein disclosure that FFT may be used in lieu of DFT. Signal processing devices that provide the DFT or FFT functionality are commonly available.

The $m^{th}$ component of the received vectors at the $l^{th}$ antenna can be then written as:

$$\begin{bmatrix} R_{k,l}(m) \\ R_{k+1,l}(m) \end{bmatrix} = \sum_{i=1}^{M} \begin{bmatrix} x_{k,1}^{(i)}(m) & x_{k,2}^{(i)}(m) \\ -x_{k,2}^{*(i)}(m) & x_{k,1}^{*(i)}(m) \end{bmatrix} \begin{bmatrix} \Omega_{1,l}^{(i)}(m) \\ \Omega_{2,l}^{(i)}(m) \end{bmatrix} + \begin{bmatrix} N_{k,l}(m) \\ N_{k+1,l}(m) \end{bmatrix}. \quad (8)$$

Let $\overline{Y}_l(m) = \begin{bmatrix} R_{k,1}(m) \\ R_{k+1,l}(m) \end{bmatrix}$, $\overline{\Omega}_l^{(i)}(m) = \begin{bmatrix} \Omega_{1,l}^{(i)}(m) \\ \Omega_{2,l}^{(i)}(m) \end{bmatrix}$, $$X^{(i)}(m) = \begin{bmatrix} x_{k,1}^{(i)}(m) & x_{k,2}^{(i)}(m) \\ -x_{k,2}^{*(i)}(m) & x_{k,1}^{*(i)}(m) \end{bmatrix}, \text{ and } \overline{N}_l(m) = \begin{bmatrix} N_{k,l}(m) \\ N_{k+1,l}(m) \end{bmatrix}$$

then expression (8) can be written as:

$$\overline{Y}_l(m) = \sum_{i=1}^{M} X^{(i)}(m) \overline{\Omega}_l^{(i)}(m) + \overline{N}_l(m) \quad (9)$$

where, $X^{(i)}(m)$ has an Alamouti-like structure and may be used to represent the STBC coding matrix used by each communication device i. In equation (9), $\overline{\Omega}_l^{(i)}(m)$ is estimated for m=0, 1, ..., N−1, a representation of a channel coefficient at each frequency tone, and a complex number in the frequency-domain. Assuming P is the number of active subcarriers, therefore the channel estimation problem decomposes into P estimation problems of size 2M×M each for an MIMO OFDM-enabled communication system. $\overline{Y}_l(m)$ in equation (9) represents the incomplete observed data that consist of M superimposed signals and AWGN, such as consecutive set of superimposed frequency-domain signal blocks 100-1 or 100-2.

Channel estimators, such 8-1 and 8-2, are disposed to receive consecutive set of superimposed frequency-domain signal blocks 100-1 and consecutive set of superimposed frequency-domain signal blocks 100-2 and to estimate channel state parameters for each channel, such as channels 10-1 through 10-4, and channels 12-1 through 12-4, that are used by computing station 16 by at least using incomplete observed data. In the example in FIG. 1, incomplete observed data includes consecutive set of superimposed frequency-domain signal blocks, such as 100-1 and 100-2, that were converted from a consecutive set of superimposed time-domain signal blocks, such as 68-1 and 68-2, respectively.

Channel estimators 8-1 and 8-2 use parameter estimation of a consecutive set of superimposed frequency-domain signal blocks, including 100-1 and 100-2, by decomposing these signal blocks, which may be expressed as illustrated in Equation (10) into complete data. In accordance with one embodiment of the present invention, this complete data for a communication device i, such as 18-1 or 18-2, at a computing station receive antenna l, such as 28-1 or 28-2, may be expressed as:

$$\overline{Y}_l^{(i)}(m) = X^{(i)}(m)\overline{\Omega}_l^{(i)}(m) + \overline{N}_l^{(i)}(m) \quad (10)$$

where, $$\sum_{i=1}^{M} \overline{Y}_l^{(i)}(m) = \overline{Y}_l(m), \text{ and } \sum_{i=1}^{M} \overline{N}_l^{(i)}(m) = \overline{N}_l(m).$$

Figure 3:
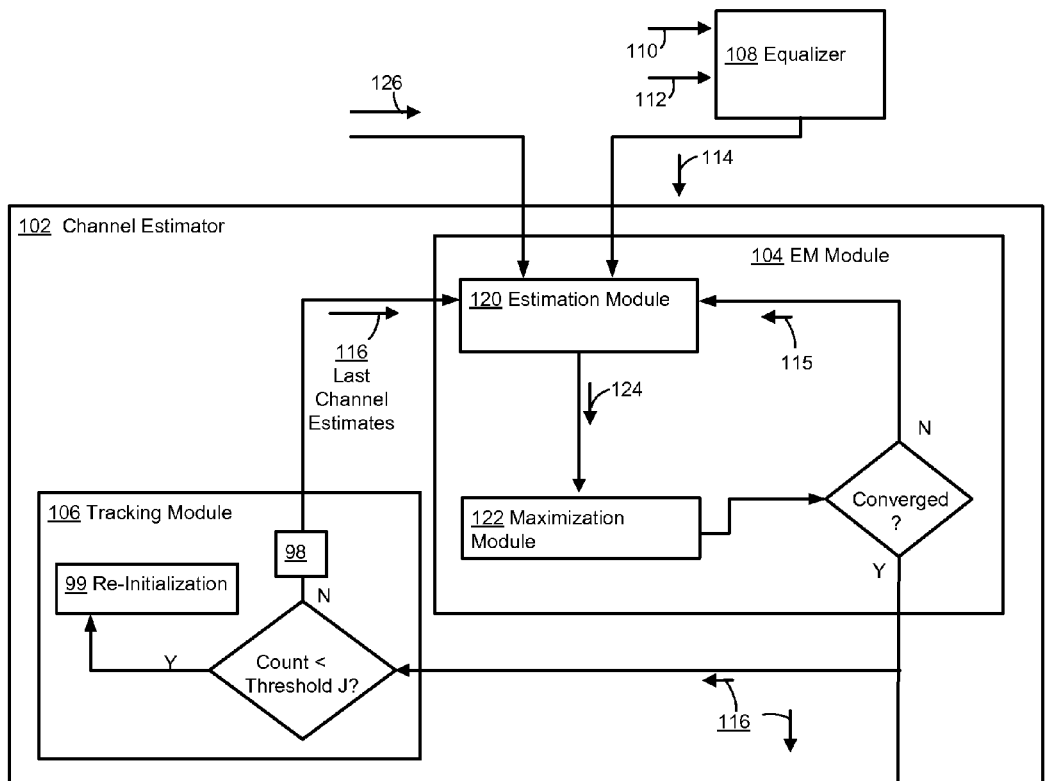
FIG. 3 is a block diagram of a channel estimator apparatus for use with a MIMO OFDM-enabled computing station that has an equalizer in accordance with yet another embodiment of the present invention.

In accordance with yet another embodiment of the present invention, channel estimators 8-1 or 8-2 may be each implemented to have substantially the same form and function as a channel estimator 102 that is illustrated in FIG. 3. Channel estimator 102 includes an estimation and maximization module, named "EM module", 104. During initialization, channel estimator 102 is disposed to receive a set of channel estimates, named collectively "initial channel estimates," that are calculated by an equalizer 108 for channels selected for estimation, such as channels 10-1 through 10-4 and channels 12-1 through 12-4 in FIG. 1.

Equalizer 108 is disposed to receive training information 110 and an initial consecutive set of superimposed frequency-domain signal blocks 112 from a preprocessor, such as preprocessor 72-1, during initialization. Initial consecutive set of superimposed frequency-domain signal blocks 112 may be received in the form of consecutive received signals (not shown) that are received before received signals 66-1 through 66-4 and that were processed and converted by preprocessors 72-1 and 72-2, as described above, to obtain initial consecutive set of superimposed frequency-domain signal blocks 112.

Training information 110 may be known information that includes training blocks, pilot symbols, preamble information, or the like. Equalizer 108 uses training information 110 and initial consecutive set of superimposed frequency-domain signal blocks 112 to calculate a set of initial channel estimates 114 for all active channels during two time units. An equalizer that calculates channel estimates by using training information and superimposed frequency domain signal blocks are commonly known by those of ordinary skill in the art and are thus, not further described to avoid adding unnecessary complexity to this disclosure. To calculate a set of initial channel estimates, such as 114 in FIG. 3, equalizer 108 may be disposed to perform the following set of equations. For each iteration K, communication device i, where i=1, 2, ... M, equalizer 108 computes:

$$\overline{Y}_l^{(i)}(m) = X^{(i)}(m)\overline{\Omega}_l^{(i)}(m) + \overline{N}_l(m) \quad (11)$$

$$\hat{\overline{\Omega}}_l^{(i)^0}(m) = (X^{(i)^H}(m)X^{(i)}(m))^{-1}X^{(i)^H}(m)\overline{Y}_l^{(i)}(m) \quad (12)$$

where, $\overline{\Omega}_l^{(i)^0}$ represents a set of initial channel estimates related to each communication device for each frequency tone (m), and can be found by one communication device transmitting training blocks for two consecutive time units while other communication devices transmit zero or null signals.

EM module 104 is disposed to use a set of initial channel estimates 114 during initialization, and a set of current channel estimates 115 during each iteration. EM module 104 is also disposed to estimate channel state information by using an iterative process and then output the last set of current channel estimates, named "last channel estimates", 116 when the iteration process converges. Last channel estimates 116 may then be received and used by suitable computing station components, such as signal detectors 74-1 and 74-2 in FIG. 1.

EM module 104 includes an estimation module 120 and a maximization module 122. Estimation module 120 calculates a decomposed signal 124 that is related to input data. This input data was processed into a set of frequency tones, collectively named an OFDM block, and ultimately sent by a communication device as a consecutive transmitted signal block set, such as 56-1 and 56-2, or 64-1 and 64-2, which are received in the form of received signals, such as received signals 66-1 and 66-3, or received signals 66-2 and 66-4. For each iteration, estimation module 120 calculates this decomposed signal by at least calculating a conditional expectation of a joint log-likelihood function condition upon another set of incomplete observed data, such as consecutive set of superimposed frequency-domain signal blocks 126, by using a set of estimates, which may include initial channel estimates, such as 114, during the first iteration; or by using a set of current channel estimates, such as 115 after the first iteration, for each iteration until it converges.

EM module 104 may calculate a decomposed signal by using the following expressions. For each iteration K and for each communication device i, where i=1, 2, ..., M, EM module 104 computes the following equations:

$$Z_l^{(i)K}(m) = X^{(i)}(m)\overline{\Omega}_l^{(i)K}(m) \quad (13)$$

$$\hat{\overline{Y}}_l^{(i)K}(m) = Z_l^{(i)K}(m) + \beta^{(i)}\left(\overline{Y}_l(m) - \sum_{j=1}^{M} Z_l^{(j)k}(m)\right) \quad (14)$$

where, $\overline{Y}_l^{(i)}(m)$ is the decomposed signal, which may also be referred to as complete data or communication device-related information, that is related to input data previously processed into a frequency tone or OFDM symbol and ultimately sent by a communication device as a consecutive transmitted signal block set, such as 56-1 and 56-2 or 64-1 and 64-2, and $$\sum_{i=1}^{M} \beta^{(i)} = 1,$$

$\beta^{(i)} \geq 0$. $\beta^{(i)}$ can be arbitrarily selected. In yet another embodiment of the present invention, $\beta^{(i)}$ may be set to equal 1/M. During the first iteration, EM module 120 uses set of initial channel estimates 114 and another set of superimposed frequency-domain signal blocks 126, which may be provided by a preprocessor, such as 72-1 or 72-2. M decomposed signals are calculated for every iteration performed by EM module 104.

For each iteration performed by estimation module 120, maximization module 122 receives the decomposed signal calculated by estimation module 120 and calculates M sets of current channel estimates. Maximization module 122 calculates each set of current channel estimates by maximizing the expectation of the joint log-likelihood function defined over a corresponding decomposed signal conditioned on a current consecutive set of superimposed frequency-domain signal blocks that was previously used by estimation module 120 in calculating the decomposed signal, such as consecutive set of superimposed frequency-domain signal blocks 126, and on a set of current channel estimates, such as 115. Consecutive set of superimposed frequency-domain signal blocks that are not used by equalizer 108 to generate a set of initial channel estimates is hereinafter named a "current consecutive set of superimposed frequency-domain signal blocks", such as 126.

The calculation of these M sets of current channel estimates may be generalized by the following expressions. For i=1, 2, ... M, maximization module 122 computes an updated channel estimate at each iteration, which may be expressed as:

$$\min_{\Omega_l^{(i)}} \left\| \hat{Y}_l^{(i)K}(m) - X^{(i)}(m)\hat{\Omega}_l^{(i)K}(m) \right\|^2 \to \hat{\Omega}_l^{(i)k+1}(m) \quad (15)$$

$$\hat{\Omega}_l^{(i)K+1}(m) = (X^{(i)H}(m)X^{(i)}(m))^{-1}X^{(i)H}(m)\hat{Y}_l^{(i)K}(m) \quad (16)$$

where, $\hat{\Omega}_l^{(i)K+1}$ represents a set of current channel estimates related to communication device i for each frequency tone (m) for a particular consecutive set of superimposed frequency-domain signal blocks, such as 126; and $X^{(i)}$ has an Alamouti-like structure and may be used to represent the STBC coding matrix at m frequency tone, for each communication device i, and for each iteration k.

In the embodiment illustrated in FIG. 3, $X^{(i)}$ is updated for each iteration although this is not intended to be limiting in any way. One of ordinary skill in the art would readily recognize after receiving the benefit of this disclosure that $X^{(i)}$ may be updated less often, which may result reduced estimation accuracy and longer latencies until convergence.

In accordance with a further embodiment of the present invention, channel estimator 102 may be further disposed to include a tracking module 106. Tracking module 106 tracks the channels used by communication devices supported by communication system 14, such as communication devices 18-1 and 18-2, and causes EM module 104 to perform another iteration process without initialization by using a set of last channel estimates, such as 116, as the set of initial channel estimates, and until a threshold number of additional current consecutive set of superimposed frequency-domain signal blocks are used during the iteration process.

In the embodiment in FIG. 3, tracking module counts the number of times, named "threshold J", EM module 104 calculates a set of last channel estimates. Counting the number of times EM module 104 calculates a set of last channel estimates may be performed by a counter module 98, which may be disposed to keep a running count of the number of sets of last channel estimates calculated. Upon reaching a selected threshold, such as threshold J, tracking module 104 resets the running count kept by counter module 98 and triggers equalizer 108 and EM module 104 to initialize, which may be accomplished using a re-initialization module 99.

Since EM module 104 is disposed to use another current consecutive set of superimposed frequency-domain signal blocks each time it performs another iteration without initialization, counting the number of times tracking module 106 provides a set of last channel estimates for use as a set of initial channel estimates also reflects the number of times another current consecutive set of superimposed frequency-domain signal blocks is used during tracking, which in turn, enables tracking module 106 to determine when the threshold number of additional current consecutive set of frequency-domain signal blocks have been met or exceeded.

During initialization, equalizer 108 receives another set of training information and another initial consecutive set of consecutive frequency-domain signal blocks, resulting in equalizer 108 calculating another set of initial channel estimates. During initialization, EM module 104 also begins the iterative process of calculating a set of last channel estimates as disclosed above by estimating a set of channel state information or parameters by using the set of initial channel estimates provided by equalizer 108. Threshold J may either be a fixed or a selectable positive integer greater than two and may be selected based on the velocity of a communication device and channel coherence time anticipated or measured. Channel coherence time is the time period during which a channel remains unchanged, and varies on the velocity of the communication device using the channel and the Doppler frequency. Channel coherence time may be calculated using the example equation below:

$$J = T_c/(2*T_{block}) \quad (17)$$

where, J is the number of times a set of channels can be estimated without re-initialization, $T_c$ is the channel coherence time, and $T_{block}$ is the OFDM block period. Channel coherence time is commonly known by those of ordinary skill in the art.

When implemented in a MIMO OFDM-enabled communication system, such as communication system 14 in FIG. 1, M communication devices and M computing station receive antennas are used, which results in M parallel processes for estimating channels that are related to these M communication devices. These M parallel processes may be implemented by using M channel estimators, such as channel estimators 8-1 and 8-2 in FIG. 1 and which may be implemented as described for channel estimator 102 in FIG. 3.

After EM module 104 calculates a set of last channel estimates, such as last channel estimates 116, this set of last channel estimates is used to detect a consecutive set of frequency-domain signal blocks from another received signal. For example, with reference also to communication system 14 in FIG. 1, M channel estimators, such as 8-1 and 8-2, which may be each disposed to have substantially the same function and structure as channel estimator 102 in FIG. 3, respectively generate a set of last channel estimates 88-1 and 88-2. Signal detectors 74-1 and 74-2 respectively use set of last channel estimates 88-1 and 88-2, a group of current consecutive set of superimposed frequency domain signal blocks, such as 90 and 94, to estimate a consecutive set of superimposed frequency domain signal blocks (not shown) from another received signal, such as received signal 92 or 96.

The various embodiments of the present invention disclose channel estimation solutions that are relatively less complex than current solutions, while remaining relatively effective in calculating CSI estimates for broadband channels in variety of environments, including environments that may suffer from slow channel fading, fast channel fading, or both. In addition, tracking module 106 renders a channel estimator that employs it, such as channel estimator 102, even more effective in fast channel fading or fast time varying wireless environments. Environments that may exhibit slow channel fading include fixed WLANs or fixed broadband wireless, while environments that exhibit fast channel fading include mobile broadband wireless access that support communication devices moving at vehicular speeds.

Figure 4:
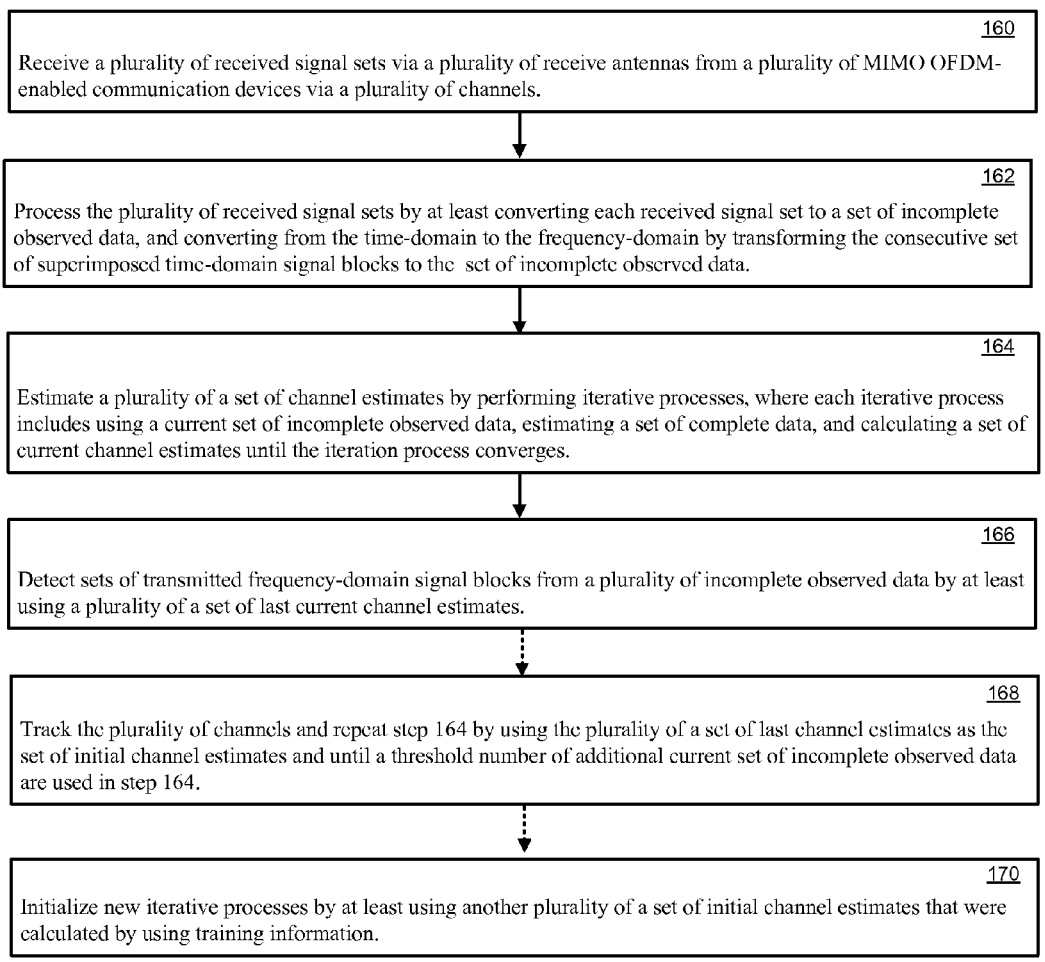
FIG. 4 is a block diagram illustrating a method for channel estimation in an OFDM MIMO-enabled communication system that includes a computing station that can detect sets of transmitted frequency-domain signal blocks by using channel estimates in accordance with yet another embodiment of the present invention.

Turning now to FIG. 4, which illustrates a method for channel estimation in an OFDM MIMO-enabled communication system that includes a computing station that can detect sets of transmitted frequency-domain signal blocks by using channel estimates in accordance with yet another embodiment of the present invention.

A plurality of received signal sets are received 160 via a plurality of antennas from a plurality of MIMO OFDM-enabled communication devices via a plurality of channels. For example, referring also to FIG. 1, this plurality of received signal sets may include a received signal set that includes received signals 66-1 and 66-3, and another received signal set that includes received signals 66-2 and 66-4. The plurality of received signals may be received by a computing station, such as computing station 16. The plurality of received signal sets may include consecutive set of transmitted signal blocks 56-1 and 56-2 and consecutive set of transmitted signal blocks 64-1 and 64-2. In another example, the received signal set that includes 66-1 and 66-3 includes consecutive set of transmitted signal blocks 56-1 and 56-2 and consecutive set of transmitted signal blocks 64-1 and 64-2. And, the received signal set that includes 66-2 and 66-4 includes consecutive set of transmitted signal blocks 56-1 and 56-2 and consecutive set of transmitted signal blocks 64-1 and 64-2.

The plurality of received signal sets are processed 162 by at least converting each received signal set into a consecutive set of superimposed time-domain signal blocks and converting from the time-domain to the frequency-domain by transforming the consecutive set of superimposed time-domain signal blocks to a set of incomplete observed data, such as consecutive set of superimposed frequency-domain signal blocks 100-1 or 100-2. The conversion of these received transmitted signal blocks may be performed by a set of front end modules 70-1 and 70-2 and a set of preprocessors 72-1 and 72-2 in FIG. 1.

A plurality of a set of channel estimates are estimated 164 by performing iterative processes, where each iterative process includes receiving a current set of incomplete data, which may be in the form of a consecutive set of superimposed frequency-domain signal blocks, calculating a set of decomposed signals, and calculating a set of current channel estimates until the iterative process converges.

Sets of transmitted frequency-domain signal blocks, such as transmitted frequency-domain signal blocks 53-1 and 64-1 in FIG. 1, are detected 166 from a plurality of incomplete observed data, such as consecutive set of superimposed frequency-domain signal blocks 90 and 94, by using a plurality of a set of last channel estimates. Detection of transmitted frequency-domain signal blocks may be accomplished conventionally, and thus the term "all sets of transmitted frequency-domain signal blocks", may be used with reference to step 166 to refer to the OFDM modulated form of an input signal, such as S1 and S2. A means for signal detecting, such as signal detectors 74-1 and 74-2 in FIG. 1, may be used to detect sets of transmitted frequency-domain signal blocks.

In accordance with an alternative embodiment of the present invention, the method disclosed in FIG. 4 may be amended to further including channel tracking. For example, the plurality of channels may be tracked 168 and step 164 is repeated without initialization by using the set of last channel estimates, and until a threshold number of additional incomplete observed data, which in this example is in the form of an additional current consecutive set of superimposed frequency-domain signal blocks, are used in step 164. When this threshold number, such as Threshold J in FIG. 3, is met or exceeded, a new iteration process is initialized 170 by at least using another set of initial channel estimates calculated by using training information.

While the present invention has been described in particular embodiments, it should be appreciated that the present invention should not be construed as limited by such embodiments. Rather, the present invention should be construed according to the claims below.

I claim:

1. A channel estimator apparatus for estimating channel state information in an MIMO OFDM-enabled communication system that includes a set of signal detectors, at least two MIMO OFDM-enabled communication devices that each employ an antenna array that includes at least two transmit antennas, and a computing station that employs an antenna array having a number of receive antennas at least equal to the number of said communication devices, the channel estimator apparatus comprising:

a first channel estimator and a second channel estimator, said first channel estimator including a first EM module and said second channel estimator including a second EM module;

wherein said first EM module is disposed to calculate a first set of decomposed signals by at least decomposing a first consecutive set of superimposed frequency-domain signal blocks into said first set of decomposed signals, said first set of decomposed signals related to a first set of data previously processed by a first communication device, and to a second set of data previously processed by a second communication device; and further disposed to output a first set of last channel estimates; and wherein said second EM module is disposed to calculate a second set of decomposed signals by at least decomposing a second consecutive set of superimposed frequency-domain signal blocks into said second set of decomposed signals, said second set of decomposed signals related to said first set data and to said second set data; and further disposed to output a second set of last channel estimates.

2. The apparatus of claim 1, wherein the computing station is disposed to process a first received signal, a second received signal, a third received signal, and a fourth received signal by at least:

converting said first and second received signals into a first consecutive set of superimposed time-domain signal blocks;

converting said third and fourth received signals into a second consecutive set of superimposed time-domain signal blocks;

transforming said first consecutive set of superimposed time-domain signal blocks into said first consecutive set of superimposed frequency-domain signal blocks; and transforming said second consecutive set of superimposed time-domain signal blocks into said first consecutive set of superimposed frequency-domain signal blocks.

3. The apparatus of claim 1, wherein:

said first set of data includes transmit frequency-domain signal blocks previously processed by said first communication device; and said second set of data includes transmit frequency-domain signal blocks previously processed by said second communication device.

4. The apparatus of claim 1, wherein:

said first and second channel estimators are further disposed to receive a first set of initial channel estimates and a second set of initial channel estimates, respectively;

wherein said first consecutive set of superimposed frequency-domain signal blocks represent matrix elements from a STBC coding matrix used by one of the MIMO OFDM-enabled communication devices; and wherein said second consecutive set of superimposed time-domain signal blocks represent matrix elements from a STBC coding matrix used by another of the MIMO OFDM-enabled communication devices.

5. The apparatus of claim 4, wherein said first set of initial channel estimates and a second set of initial channel estimates are computed by a first equalizer and second equalizer by using at least a set of training information, a third consecutive set of consecutive superimposed frequency-domain signal blocks, and a fourth consecutive set of superimposed frequency-domain signal blocks, respectively.

6. The apparatus of claim 1, wherein said first set of decomposed signals include a first and second set of OFDM blocks, and said second set of decomposed signals include a third and fourth set of OFDM blocks.

7. The apparatus of claim 1, wherein said first EM module performs said decomposing by at least calculating a conditional expectation of a joint log-likelihood function condition upon said first consecutive set of superimposed frequency-domain signal blocks, and using a set of channel estimates.

8. The apparatus of claim 7, wherein said set of channel estimates include an initial channel estimate.

9. The apparatus of claim 7, wherein said set of channel estimates include a current channel estimate.

10. The apparatus of claim 7, wherein said set of channel estimates include said first set of last channel estimates.

11. An OFDM MIMO-enabled communication system, the system including:
a computing station configured to receive a first received signal and a second received signal and to process said first and second received signals by at least converting said first and second received signals into a first consecutive set of superimposed time-domain signal blocks, and a third received signal and a fourth received signal and to process said third and fourth received signals by at least converting said third and fourth received signals into a second consecutive set of superimposed time-domain signal blocks, said computing station including:
a first channel estimator and a second channel estimator, said first channel estimator including a first equalizer and a first EM module and said second channel estimator including a second equalizer and a second EM module;
wherein said first and second equalizers disposed to compute a first set of initial channel estimates and a second set of initial channel estimates, respectively, by using at least a set of training information and a consecutive set of superimposed frequency-domain signal blocks and a second consecutive set of superimposed frequency-domain signal blocks;
wherein said first EM module disposed to decompose a third consecutive set of superimposed frequency-domain signal blocks into a first set of decomposed signals and a second set of decomposed signals that are related to a first data set previously processed by a first communication device and a second communication device, respectively, and to output a first set of last channel estimates for channels used by said first and second communication devices; and
said second EM module disposed to decompose a fourth consecutive set of superimposed frequency-domain signal blocks into a third set of decomposed signals and a fourth set of decomposed signals that are related to a second data set previously processed by said first and second communication devices, respectively, and to output a second set of last channel estimates for channels used by said first and second devices.

12. The system of claim 11, wherein said computing station further includes:
a first preprocessor and a second preprocessor, said first preprocessor disposed to receive said first consecutive set of superimposed time-domain signal blocks and to convert said first consecutive set of superimposed time-domain signal blocks into said first consecutive set of superimposed frequency-domain signal blocks; and
said second preprocessor disposed to receive said second consecutive set of superimposed time-domain signal blocks and to convert said second consecutive set of superimposed time-domain signal blocks into said second consecutive set of superimposed frequency-domain signal blocks.

13. The system of claim 12, wherein:
said first and second received signals include said first consecutive set of superimposed time-domain signal blocks and said third and fourth received signals include said second consecutive set of superimposed time-domain signal blocks;
said first consecutive set of superimposed time-domain signal blocks includes all consecutive transmitted signal block sets that were transmitted by said first and second devices during two consecutive time slots; and
said second consecutive superimposed time-domain signal block sets includes said all consecutive transmitted signal block sets transmitted by said first and second devices during said two consecutive time slots.

14. The system of claim 11, wherein said computing station further includes a front end module disposed to receive said first and second received signals and to perform said converting of said first and second received signals.

15. The system of claim 14, wherein said front end module includes:
a first RF interface having an input node disposed to receive said first and second received signals through a first antenna; and
a first preprocessor, said first preprocessor disposed to receive said first consecutive set of superimposed time-domain signal blocks and to convert said first consecutive set of superimposed time-domain signal blocks into said first consecutive set of superimposed frequency-domain signal blocks.

16. The system of claim 11, wherein said computing station further includes a first antenna and a second antenna, said first antenna disposed to receive said first and second received signals that include said first consecutive set of superimposed time-domain signal blocks, and said second antenna disposed to receive said third and fourth received signals that include said second consecutive set of time-domain superimposed signal blocks.

17. The system of claim 11, wherein said training information includes training blocks.

18. The system of claim 11, wherein said third consecutive set of superimposed frequency-domain signal blocks are decomposed by at least calculating a conditional expectation of a joint log-likelihood function conditioned upon said third consecutive set of superimposed frequency-domain signal blocks by using said first set of initial channel estimates.

19. The system of claim 11, wherein said third consecutive set of superimposed frequency-domain signal blocks are decomposed and said first set of last channel estimates are calculated by using an expectation and maximization process.

20. The system of claim 19, wherein said expectation and maximization process includes calculating a conditional expectation of a joint log-likelihood function conditioned upon said fourth set of superimposed frequency-domain signal block sets by using a set of current channel estimates.

21. The system of claim 20, wherein said set of current channel estimates are obtained by using said first set of initial channel estimates.

22. The system of claim 20, wherein said set of current channel estimates are obtained by at least calculating a conditional expectation of a joint log-likelihood function conditioned upon a fifth set of superimposed frequency-domain signal block sets by using a set of last channel estimates.

23. The system of claim 11, wherein said training information includes pilot symbols.

24. The system of claim 11, wherein said training information includes preamble information.

25. The system of claim 11:
further including a first tracking module for adapting to dynamic changes to channels associated with said first and second devices by providing said first set of last channel estimates to said first EM module; and
wherein said first EM module calculating a conditional expectation of a joint log-likelihood function conditioned upon a sixth set of superimposed frequency-domain signal block sets by using said first set of last channel estimates, wherein said sixth set of superimposed frequency-domain signal block sets are received through a first antenna.

26. The system of claim 25, wherein said second EM module outputs a third set of last channel estimates.

27. The system of claim 25:
further including a second tracking module for adapting to dynamic changes to channels associated with said first and second devices by providing said second set of last channel estimates to said second EM module; and
wherein said second EM module calculating a conditional expectation of a joint log-likelihood function conditioned upon a seventh set of superimposed frequency-domain signal block sets by using said second set of last channel estimates, wherein said seventh set of superimposed frequency-domain signal block sets are received through a second antenna.

28. The system of claim 27, wherein said first and second tracking modules are disposed to operate independently and in parallel with each other.

29. The system of claim 27, wherein said second EM module outputs a fourth set of last channel estimates.

30. The system of claim 11, further including a signal detector disposed to estimate sets of transmitted frequency-domain signal blocks that are related to said first and second communication devices, and to use said first set of last channel estimates.

31. The system of claim 30, wherein said signal detector is further disposed to use a current consecutive set of superimposed frequency-domain signal block sets.

32. The system of claim 11, wherein said first and second communication devices are disposed to use an Alamouti space time block coding scheme.

33. The system of claim 11, wherein said first and second communication devices are disposed to use an orthogonal space time block coding scheme.

34. The system of claim 11, wherein said first and second communication devices use a STBC block encoding scheme.

35. The system of claim 11, wherein said first and second communication devices communicate with said computing station via a plurality of wireless channels, wherein each of said channels includes a plurality of frequency tones.

36. The system of claim 11, wherein said first communication device is disposed to transmit a set of transmit frequency-domain signal blocks as time-domain signals through said first and second antennas.

37. A computing device operated method for estimating channel state information for a MIMO OFDM-enabled communication system that includes at least one signal detector, a plurality of MIMO OFDM-enabled communication devices that each employ an antenna array that includes at least two transmit antennas, and a computing station that employs an antenna array having a plurality of receive antennas; said plurality of MIMO OFDM-enabled communication devices including a first communication device and a second communication device, the method comprising:
performing iterative processes with each iterative process including receiving a current consecutive set of superimposed frequency-domain signal blocks; calculating a set of decomposed signals; and calculating a set of current channel estimates for each iteration until said iterative process converges;
wherein said calculating a set of decomposed signals includes: decomposing a first consecutive set of superimposed frequency-domain signal blocks into said first set of decomposed signals, said first set of decomposed signals related to a first input data previously processed by the first communication device and to a second input data previously processed by the second communication device, and
decomposing a second consecutive set of superimposed frequency-domain signal blocks into said second set of decomposed signals, said second set of decomposed signals related to said first input data and to said second input data;
wherein said decomposing a first consecutive set of superimposed frequency-domain signal blocks includes calculating a conditional expectation of a joint log-likelihood function condition upon said first consecutive set of superimposed frequency-domain signal blocks, and using a first set of channel estimates; and
wherein said decomposing a second consecutive set of superimposed frequency-domain signal blocks includes calculating a conditional expectation of a joint log-likelihood function condition upon said second consecutive set of superimposed frequency-domain signal blocks, and using a second set of channel estimates.

38. The method of claim 37, wherein the MIMO OFDM-enabled communication system further includes a first equalizer and a second equalizer; and further including:
receiving a first set of initial channel estimates and a second set of initial channel estimates;
computing said first set of initial channel estimates and said second set of initial channel estimates by using said first equalizer and said second equalizer;
initializing a set of channel estimators by causing: a set of training information, a third consecutive set of superimposed frequency-domain signal blocks to be received by said first equalizer, and a fourth consecutive set of superimposed frequency-domain signal blocks to be received by said second equalizer.

39. The method of claim 38, wherein said third and fourth consecutive set of superimposed frequency-domain signal blocks correspond to received signals that are received before received signals that correspond to said first and second consecutive set of superimposed frequency-domain signal blocks.

40. The method of claim 37, wherein said first set of channel estimates includes an initial channel estimate.

41. The method of claim 37, wherein said first set of channel estimates includes a current channel estimate.

42. The method of claim 37, wherein said first set of channel estimates includes said first set of last channel estimates.

43. The method of claim 37, wherein said estimating a first set of decomposed signals and said estimating a second set of decomposed signals are performed by a channel estimator means that includes a first channel estimator and a second channel estimator.

44. A computing device-operated method for channel estimation in an OFDM MIMO-enabled communication system that includes a computing station that can detect sets of transmitted frequency-domain signal blocks by using channel estimates, method comprising:
receiving, via a plurality of antennas from a plurality of MIMO OFDM-enabled communication devices via a plurality of channels, a plurality of received signal sets that each respectively include a consecutive set of superimposed time-domain signal blocks;
processing said set of received signals by at least converting said consecutive set of superimposed time-domain signal blocks from said time-domain to the frequency-domain by transforming said consecutive set of superimposed time-domain signal blocks to a consecutive set of superimposed frequency-domain signal blocks;
estimating a plurality of a set of channel estimates, said estimating includes performing a plurality of iterative processes, wherein an iterative process from said plurality of iterative processes, includes using a current consecutive set of superimposed frequency-domain signal blocks, calculating a set of decomposed signals, and calculating a set of current channel estimates until said iterative process converges; and
detecting said sets of transmitted frequency-domain signal blocks, wherein said detecting includes using a set of last channel estimates.

45. The method of claim 44:
further including tracking said plurality of channels, wherein said tracking includes repeating said performing, and using said set of last channel estimates as a set of initial channel estimates when performing a first iteration under said iterative process; and
wherein said performing an iterative process is repeated until a threshold number is met.

46. The method of claim 45, wherein said threshold number corresponds to a number additional current consecutive set of superimposed frequency-domain signal blocks that may be used during said iterative processed.

47. The method of claim 45, wherein said threshold number corresponds to a number of times said set of last channel estimates may be used for initializing said iterative process without performing a re-initialization process.

48. The method of claim 45, wherein said threshold number corresponds to a number of times said set of last channel estimates may be used for initializing said iterative process without sending training information.

49. The method of claim 44, wherein:
said calculating a set of decomposed signals includes decomposing said consecutive set of superimposed frequency-domain signal blocks;
said decomposing and said estimating includes using an expectation and maximization method; and
said set of decomposed signals are related to said MIMO OFDM-enabled communication devices.

50. The method of claim 44, wherein said decomposing said consecutive set of superimposed frequency-domain signal blocks includes calculating a conditional expectation of a joint log-likelihood function conditioned upon another consecutive set of superimposed frequency-domain signal blocks using said set of current channel estimates.

51. The method of claim 50, wherein said calculating said set of current channel estimates includes maximizing a conditional expectation of a joint log-likelihood function defined over said set of decomposed signals conditioned on said another consecutive set of superimposed frequency-domain signal blocks and said set of current channel estimates.

52. The method of claim 44, wherein said calculating a set of decomposed signals further includes performing an initialization process that includes using a set of initial channel estimates.

53. The method of claim 52, further includes obtaining said set of initial channel estimates by transmitting training information via said plurality of channels.

54. The method of claim 53, wherein said transmitting training information includes transmitting training signal blocks.

55. The method of claim 53, wherein said transmitting training information includes transmitting pilot symbols.

56. The method of claim 44, wherein said MIMO OFDM-enabled communication devices wirelessly transmit a plurality of consecutive transmitted signal block sets which are received as said plurality of received signal sets.

57. The method of claim 44, further including transmitting a plurality of consecutive transmitted signal block sets by using at least two transmit antennas.

58. The method of claim 57, further including using an Alamouti space time block coding scheme to transmit said consecutive transmitted signal block sets.

59. The method of claim 57, further including using an orthogonal space time block coding scheme to transmit said consecutive transmitted signal block sets.

60. The method of claim 44, wherein said received signal block sets were modulated using OFDM.

61. A channel estimator apparatus for estimating channel state information in an MIMO OFDM-enabled communication system that includes a set of signal detectors, at least two MIMO OFDM-enabled communication devices that each employ an antenna array that includes at least two transmit antennas, and a computing station that employs an antenna array having a number of receive antennas at least equal to the number of said communication devices, the channel estimator apparatus comprising:
a means for estimating channel state information that includes a means for calculating decomposed signals;
wherein said mean for calculating decomposed signals is disposed to calculate a first set of decomposed signals by at least decomposing a first consecutive set of superimposed frequency-domain signal blocks into said first set of decomposed signals, said first set of decomposed signals related to a first set of data previously processed by a first communication device, and to a second set of data previously processed by a second communication device; and further disposed to output a first set of last channel estimates; and
wherein said means for calculating decomposed signals is further disposed to calculate a second set of decomposed signals by at least decomposing a second consecutive set of superimposed frequency-domain signal blocks into said second set of decomposed signals, said second set of decomposed signals related to said first set data and to said second set data; and further disposed to output a second set of last channel estimates.

62. The apparatus of claim 61, wherein said means for estimating channel state information further includes a means for tracking channel state information.

63. The apparatus of claim 61, wherein the computing station is disposed to process a first received signal, a second received signal, a third received signal, and a fourth received signal by at least:
 converting said first and second received signals into a first consecutive set of superimposed time-domain signal blocks;
 converting said third and fourth received signals into a second consecutive set of superimposed time-domain signal blocks;
 transforming said first consecutive set of superimposed time-domain signal blocks into said first consecutive set of superimposed frequency-domain signal blocks; and
 transforming said second consecutive set of superimposed time-domain signal blocks into said first consecutive set of superimposed frequency-domain signal blocks.

64. The apparatus of claim 61, wherein:
 said first set of data includes transmit frequency-domain signal blocks previously processed by said first communication device; and
 said second set of data includes transmit frequency-domain signal blocks previously processed by said second communication device.

65. The apparatus of claim 61, wherein:
 said means for calculating decomposed signals is further disposed to receive a first set of initial channel estimates and a second set of initial channel estimates;
 wherein said first consecutive set of superimposed frequency-domain signal blocks represent matrix elements from a STBC coding matrix used by one of the MIMO OFDM-enabled communication devices; and
 wherein said second consecutive set of superimposed time-domain signal blocks represent matrix elements from a STBC coding matrix used by another of the MIMO OFDM-enabled communication devices.

66. The apparatus of claim 65, further including:
 a means for equalizing; and
 wherein said means for equalizing is disposed to compute said first set of initial channel estimates and a second set of initial channel estimates by at least using set of training information, a third consecutive set of consecutive superimposed frequency-domain signal blocks, and a fourth consecutive of superimposed frequency-domain signal blocks.

67. The apparatus of claim 61, wherein said first set of decomposed signals include a first and second set of OFDM blocks, and said second set of decomposed signals include a third and fourth set of OFDM blocks.

68. The apparatus of claim 61, wherein said means for calculating decomposed signals includes a first EM module and a second EM module.

69. The apparatus of claim 68, wherein said first EM module performs said decomposing by at least calculating a conditional expectation of a joint log-likelihood function conditional upon said first consecutive set of superimposed frequency-domain signal blocks, and using a set of channel estimates.

70. The apparatus of claim 69, wherein said set of channel estimates include an initial channel estimate.

71. The apparatus of claim 69, wherein said set of channel estimates include a current channel estimate.

72. The apparatus of claim 69, wherein said set of channel estimates include said first set of last channel estimates.

73. An OFDM MIMO-enabled communication system, the system including:
 a computing station configured to receive a first received signal and a second received signal and to process said first and second received signals by at least converting said first and second received signals into a first consecutive set of superimposed time-domain signal blocks, and a third received signal and a fourth received signal and to process said third and fourth received signals by at least converting said third and fourth received signals into a second consecutive set of superimposed time-domain signal blocks, said computing station including:
 a means for estimating channel state information, said means for estimating including a means for equalizing and a means for calculating decomposed signals;
 wherein said means for equalizing is disposed to compute a first set of initial channel estimates and a second set of initial channel estimates, respectively, by using at least a set of training information and a first consecutive set and a second consecutive set of superimposed frequency-domain signal blocks;
 wherein said means for calculating is disposed to decompose a third consecutive set of superimposed frequency-domain signal blocks into a first set of decomposed signals and a second set of decomposed signals that are related to a first data set previously processed by a first communication device and a second communication device, respectively, and to output a first set of last channel estimates for channels used by said first and second communication devices; and
 said means for calculating is further disposed to decompose a fourth consecutive set of superimposed frequency-domain signal blocks into a third set of decomposed signals and a fourth set of decomposed signals that are related to a second data set previously processed by said first and second communication devices, respectively, and to output a second set of last channel estimates for channels used by said first and second devices.

74. The system of claim 73, wherein said means for equalizing includes a first equalizer and a second equalizer; and said means for calculating decomposed signals includes a first EM module and a second EM module.

75. The system of claim 73, wherein said computing station further includes a means for preprocessing received signals that is disposed to receive a first consecutive set of superimposed time-domain signal blocks and to convert said first consecutive set of superimposed time-domain signal blocks into said first consecutive set of superimposed frequency-domain signal blocks; and to receive a second consecutive set of superimposed time-domain signal blocks and to convert said second consecutive set of superimposed time-domain signal blocks into said second consecutive set of superimposed frequency-domain signal blocks.

76. The system of claim 75, where said means for preprocessing received signals includes a first preprocessor and a second preprocessor.

77. The system of claim 75, wherein:
 said first and second received signals include said first consecutive set of superimposed time-domain signal blocks and said third and fourth received signals include said second consecutive set of superimposed time-domain signal blocks;
 said first consecutive set of superimposed time-domain signal blocks includes all consecutive transmitted signal block sets that were transmitted by said first and second devices during two consecutive time slots; and
 said second consecutive superimposed time-domain signal block sets includes said all consecutive transmitted signal block sets transmitted by said first and second devices during said two consecutive time slots.

78. The system of claim 73, wherein said computing station further includes a front end module disposed to receive said first and second received signals and to perform said converting of said first and second received signals.

79. The system of claim 78, wherein said front end module includes:
- a first RF interface having an input node disposed to receive said first and second received signals through a first antenna; and
- a means for preprocessing received signals, said means for preprocessing disposed to receive said first consecutive set of superimposed time-domain signal blocks and to convert said first consecutive set of superimposed time-domain signal blocks into said first consecutive set of superimposed frequency-domain signal blocks.

80. The system of claim 74, wherein said computing station further includes a first antenna and a second antenna, said first antenna disposed to receive said first and second received signals that include said first consecutive set of superimposed time-domain signal blocks, and said second antenna disposed to receive said third and fourth received signals that include said second consecutive set of time-domain superimposed signal blocks.

81. The system of claim 73, wherein said training information includes training blocks.

82. The system of claim 73, wherein said third consecutive set of superimposed frequency-domain signal blocks are decomposed and said first set of last channel estimates are calculated by using an expectation and maximization process.

83. The system of claim 82, wherein said expectation and maximization process includes calculating a conditional expectation of a joint log-likelihood function conditioned upon said fourth set of superimposed frequency-domain signal block sets by using a set of current channel estimates.

84. The system of claim 83, wherein said set of current channel estimates are obtained by using said first set of initial channel estimates.

85. The system of claim 83, wherein said set of current channel estimates are obtained by at least calculating a conditional expectation of a joint log-likelihood function conditioned upon a fifth set of superimposed frequency-domain signal block sets by using a set of last channel estimates.

86. The system of claim 73, wherein said third consecutive set of superimposed frequency-domain signal blocks are decomposed by at least calculating a conditional expectation of a joint log-likelihood function conditioned upon said third consecutive set of superimposed frequency-domain signal blocks by using said first set of initial channel estimates.

87. The system of claim 73, wherein said training information includes pilot symbols.

88. The system of claim 73, wherein said training information includes preamble information.

89. The system of claim 80, further including a means for tracking channel state information, said means for tracking disposed to track changes to channels associated with said first and second devices by providing said first set of last channel estimates to said means for calculating decomposed signals.

90. The system of claim 89, wherein said means for calculating decomposed signals disposed to calculate a conditional expectation of a joint log-likelihood function conditioned upon a sixth set of superimposed frequency-domain signal block sets by using said first set of last channel estimates, wherein said sixth set of superimposed frequency-domain signal block sets received through said first antenna.

91. The system of claim 90, wherein said means for calculating decomposed signals includes a first EM module and a second EM module.

92. The system of claim 91, wherein said second EM module outputs a third set of last channel estimates.

93. The system of claim 89, wherein said means for tracking is further disposed to track said changes to channels by providing said second set of last channel estimates to said second EM module; and
- wherein said second EM module disposed to calculate a conditional expectation of a joint log-likelihood function conditioned upon a seventh set of superimposed frequency-domain signal block sets by using said second set of last channel estimates, wherein said seventh set of superimposed frequency-domain signal block sets received through said second antenna.

94. The system of claim 93, wherein means for tracking includes a first tracking module and a second tracking module that are disposed to operate independently and in parallel with each other.

95. The system of claim 93, wherein said second EM module outputs a fourth set of last channel estimates.

96. The system of claim 73, further includes a means for signal detecting that is disposed to estimate sets of transmitted frequency-domain signal blocks that are related to said first and second communication devices, and to use said set of last channel estimates.

97. The system of claim 96, wherein said means for signal detecting is further disposed to use a current consecutive set of superimposed frequency-domain signal block sets.

98. The system of claim 96, wherein said means for signal detecting includes a first signal detector and a second signal detector.

99. The system of claim 73, wherein said first and second communication devices are disposed to use an Alamouti space time block coding scheme.

100. The system of claim 73, wherein said first and second communication devices are disposed to use an orthogonal space time block coding scheme.

101. The system of claim 73, wherein said first and second communication devices use a STBC block encoding scheme.

102. The system of claim 73, wherein said first and second communication devices communicate with said computing station via a plurality of wireless channels, wherein each of said channels includes a plurality of frequency tones.

103. The system of claim 73, wherein said first communication device is disposed to transmit said set of transmit frequency-domain signal blocks as time-domain signals through said first and second antennas.

104. A computing device operated method for estimating channel state information for a MIMO OFDM-enabled communication system that includes at least one signal detector, M MIMO OFDM-enabled communication devices that each employ an antenna array that includes at least two transmit antennas, and a computing station that employs an antenna array having a M receive antennas, wherein M is greater than one; said M MIMO OFDM-enabled communication devices including a first communication device and a second communication device, the method comprising:
- performing iterative processes with each iterative process including using a current set of incomplete observed data; calculating a set of decomposed signals; and calculating a set of current channel estimates for each iteration until said iterative process converges;
- wherein said calculating a set of decomposed signals includes: decomposing a first set of incomplete observed data into said first set of decomposed signals, said first set of decomposed signals related to a first input data previously processed by the first communication device and to a second input data previously processed by the second communication device;

decomposing a second set of incomplete observed data into said second set of decomposed signals, said second set of decomposed signals related to said first input data and to said second input data;

wherein said decomposing a first set of incomplete observed data includes calculating a conditional expectation of a joint log-likelihood function condition upon said first set of incomplete observed, and using a first set of channel estimates; and wherein said decomposing a second set of incomplete observed data includes calculating a conditional expectation of a joint log-likelihood function condition upon said second set of incomplete observed data, and using a second set of channel estimates.

105. The method of claim 104, wherein said first incomplete observed data includes said first consecutive set of superimposed frequency-domain signal blocks and said second incomplete observed data includes said second consecutive set of superimposed frequency-domain signal blocks.

106. The method of claim 105, wherein the MIMO OFDM-enabled communication system further includes a first equalizer and a second equalizer; and further including:

receiving a first set of initial channel estimates and a second set of initial channel estimates; and computing said first set of initial channel estimates and said second set of initial channel estimates by using said first equalizer and said second equalizer.

107. The method of claim 106, wherein the MIMO OFDM-enabled communication system further includes said first equalizer and said second equalizer; and further including initializing said channel estimators by causing: a set of training information, a third set of incomplete observed data to be received by said first equalizer, and a fourth set of incomplete observed data to be received by said second equalizer.

108. The method of claim 107, wherein said third set of incomplete observed data includes a third consecutive set of superimposed frequency-domain signal blocks, and said fourth set of incomplete observed data includes a fourth consecutive set of superimposed frequency-domain signal blocks.

109. The method of claim 108, wherein said third and fourth consecutive set of superimposed frequency-domain signal blocks correspond to received signals that are received before received signals that correspond to said first and second consecutive set of superimposed frequency-domain signal blocks.

110. The method of claim 105, wherein said first set of channel estimates includes an initial channel estimate.

111. The method of claim 105, wherein said first set of channel estimates includes a current channel estimate.

112. The method of claim 105, wherein said first set of channel estimates includes said first set of last channel estimates.

113. The method of claim 105, wherein said estimating a first set of decomposed signals and said estimating a second set of decomposed signals are performed by a channel estimator means that includes a first channel estimator and a second estimator.

114. A computing device-operated method for channel estimation in an OFDM MIMO-enabled communication system that includes a computing station that can detect sets of transmitted frequency-domain signal blocks by using channel estimates, method comprising:

receiving, via a plurality of antennas from a plurality of MIMO OFDM-enabled communication devices via a plurality of channels, a plurality of received signal sets that each respectively include a consecutive set of superimposed time-domain signal blocks;

processing said set of received signals by at least converting said consecutive set of superimposed time-domain signal blocks from said time-domain to the frequency-domain by transforming said consecutive set of superimposed time-domain signal blocks to a set of incomplete observed data;

estimating a plurality of a set of channel estimates, said estimating includes performing a plurality of iterative processes, wherein an iterative process from said plurality of iterative processes, includes using a current set of incomplete observed data, calculating a set of decomposed signals, and calculating a set of current channel estimates until said iterative process converges; and detecting said sets of transmitted frequency-domain signal blocks, wherein said detecting includes using a set of last channel estimates.

115. The method of claim 114:

further including tracking said plurality of channels, wherein said tracking includes repeating said performing, and using said set of last channel estimates as a set of initial channel estimates when performing a first iteration under said iterative process; and wherein said performing an iterative process is repeated until a threshold number is met.

116. The method of claim 114, wherein said set of incomplete observed data includes a consecutive set of superimposed frequency domain signal blocks.

* * * * *